United States Patent
Tanaka

(10) Patent No.: US 10,388,027 B2
(45) Date of Patent: Aug. 20, 2019

(54) DETECTION METHOD, DISPLAY APPARATUS, AND DETECTION SYSTEM

(71) Applicant: KYOCERA Corporation, Kyoto (JP)

(72) Inventor: Nao Tanaka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 150 days.

(21) Appl. No.: 15/608,031

(22) Filed: May 30, 2017

(65) Prior Publication Data

US 2017/0352160 A1 Dec. 7, 2017

(30) Foreign Application Priority Data

Jun. 1, 2016 (JP) .................... 2016-110419
Jun. 1, 2016 (JP) .................... 2016-110423
Jun. 1, 2016 (JP) .................... 2016-110425
Jun. 1, 2016 (JP) .................... 2016-110440
Jun. 1, 2016 (JP) .................... 2016-110445

(51) Int. Cl.
*G06T 7/593* (2017.01)
*G06F 3/01* (2006.01)
*G06F 1/16* (2006.01)
*G06F 3/03* (2006.01)

(52) U.S. Cl.
CPC .............. *G06T 7/593* (2017.01); *G06F 1/163* (2013.01); *G06F 3/011* (2013.01); *G06F 3/012* (2013.01); *G06F 3/0304* (2013.01); *G06F 3/0325* (2013.01)

(58) Field of Classification Search
CPC .............. G06T 7/593; G06T 7/20; G06T 7/73
See application file for complete search history.

(56) References Cited

U.S. PATENT DOCUMENTS

| | | | | |
|---|---|---|---|---|
| 4,672,562 A | * | 6/1987 | Egli | G01S 5/163 348/140 |
| 8,761,434 B2 | * | 6/2014 | Marks | G06T 7/20 382/103 |
| 9,561,442 B2 | * | 2/2017 | Shimizu | A63F 13/10 |
| 10,175,765 B2 | * | 1/2019 | Wada | G06F 3/017 |
| 10,235,762 B1 | * | 3/2019 | Wylie | G06T 7/20 |
| 2003/0210407 A1 | * | 11/2003 | Xu | G01B 11/2545 356/611 |
| 2005/0256395 A1 | * | 11/2005 | Anabuki | G06T 7/80 600/414 |
| 2008/0316324 A1 | * | 12/2008 | Rofougaran | A63F 13/235 348/222.1 |

(Continued)

FOREIGN PATENT DOCUMENTS

JP 2007-071782 A 3/2007

*Primary Examiner* — Anand P Bhatnagar

(74) *Attorney, Agent, or Firm* — Studebaker & Brackett PC

(57) ABSTRACT

Provided is a position detection method using a first imaging unit and a second imaging unit that each capture an image of an object. The detection method may include: acquiring a first captured image with use of the first imaging unit; acquiring a second captured image with use of the second imaging unit; defining a position vector of the object based on the first captured image; calculating a first direction vector directed from the second imaging unit to the object with use of the defined position vector; calculating a second direction vector directed from the second imaging unit to the object based on the second captured image; and calculating a position of the object based on the first direction vector and the second direction vector.

18 Claims, 8 Drawing Sheets

(56) References Cited

U.S. PATENT DOCUMENTS

| | | | | |
|---|---|---|---|---|
| 2009/0148036 A1* | 6/2009 | Aoyama | ................ | G06T 5/006 |
| | | | | 382/154 |
| 2010/0150404 A1* | 6/2010 | Marks | ...................... | G06T 7/20 |
| | | | | 382/107 |
| 2011/0286632 A1* | 11/2011 | Tuxen | ................ | A63B 24/0021 |
| | | | | 382/103 |
| 2014/0327780 A1* | 11/2014 | Herrli Anderegg | .......................... | |
| | | | | G08B 13/19645 |
| | | | | 348/159 |

* cited by examiner

DETECTION METHOD, DISPLAY APPARATUS, AND DETECTION SYSTEM

CROSS-REFERENCE TO RELATED APPLICATIONS

This application claims priority to and the benefit of Japanese patent application Nos. 2016-110419 filed on Jun. 1, 2016, 2016-110423 filed on Jun. 1, 2016, 2016-110425 filed on Jun. 1, 2016, 2016-110440 filed on Jun. 1, 2016, and 2016-110445 filed on Jun. 1, 2016, the entire contents of which are incorporated herein by reference.

TECHNICAL FIELD

The present disclosure relates to a detection method, a display apparatus, and a detection system.

BACKGROUND

An example of an existing system detects the position of an object with use of a camera.

SUMMARY

One of aspects resides in a detection method performed by a system including a first imaging unit and a second imaging unit that each capture an image of an object. The detection method includes: acquiring a first captured image with use of the first imaging unit; and acquiring a second captured image with use of the second imaging unit. The detection method also includes: defining a position vector of the object based on the first captured image; calculating a first direction vector directed from the second imaging unit to the object with use of the defined position vector; and calculating a second direction vector directed from the second imaging unit to the object based on the second captured image. The detection method also includes: calculating a position of the object based on the first direction vector and the second direction vector.

Another aspect resides in a display apparatus to be mounted on a user's head. The display apparatus includes: a light source; a sensor; a communication interface; and a controller. The sensor is configured to detect a change in angles around three axes of the user's head. The communication interface is configured to acquire information pertaining to a position of the light source that is identified based on a plurality of images of the light source captured by a plurality of imaging apparatuses. The controller is configured to perform display control in accordance with the position of the light source and with a direction of the user's head identified based on output from the sensor.

Yet another aspect resides in a detection system, including: a first imaging unit that acquires a first captured image pertaining to an object; a second imaging unit that acquires a second captured image pertaining to the object; and a controller that calculates a position of the object based on the first captured image and the second captured image. The controller defines a position vector of the object based on the first captured image, calculates a first direction vector directed from the second captured image to the object with use of the defined position vector, and calculates a second direction vector directed from the second imaging unit to the object based on the second captured image. The controller also calculates the position of the object based on the first direction vector and the second direction vector.

DETAILED DESCRIPTION

Embodiments are described in detail below with reference to the drawings.

Embodiment 1

Figure 1:
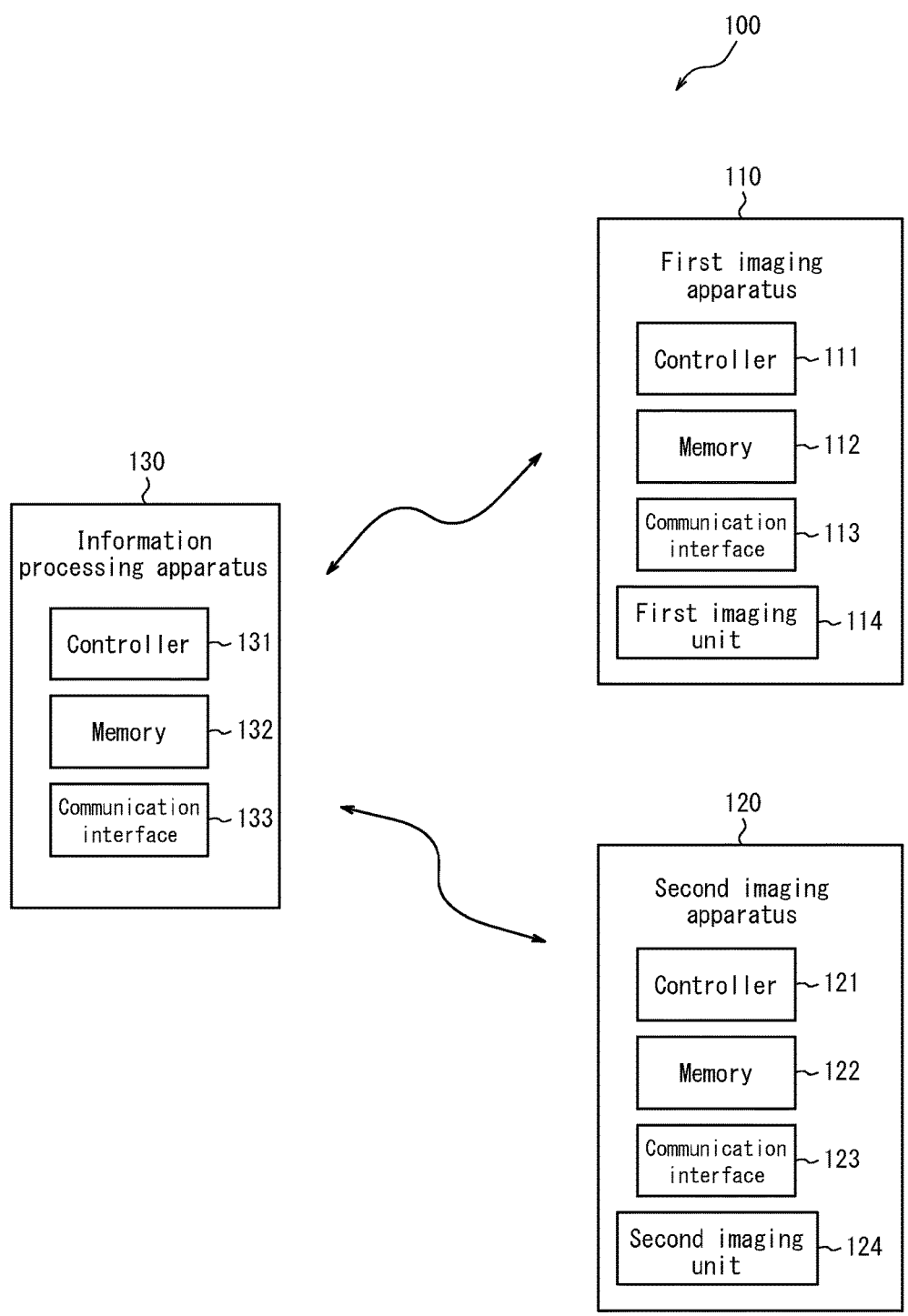
FIG. 1 is a function block diagram illustrating a schematic configuration of a position detection system according to Embodiment 1.

FIG. 1 is a function block diagram illustrating a schematic configuration of a position detection system 100 according to Embodiment 1. The position detection system 100 according to the present embodiment includes a plurality of imaging apparatuses and an information processing apparatus 130, which is configured to communicate with the imaging apparatuses. In the present embodiment, as illustrated in FIG. 1, the position detection system 100 includes, as the plurality of imaging apparatuses, two imaging apparatuses, namely, a first imaging apparatus 110 and a second imaging apparatus 120. The position detection system 100 may also include three or more imaging apparatuses.

Figure 2:
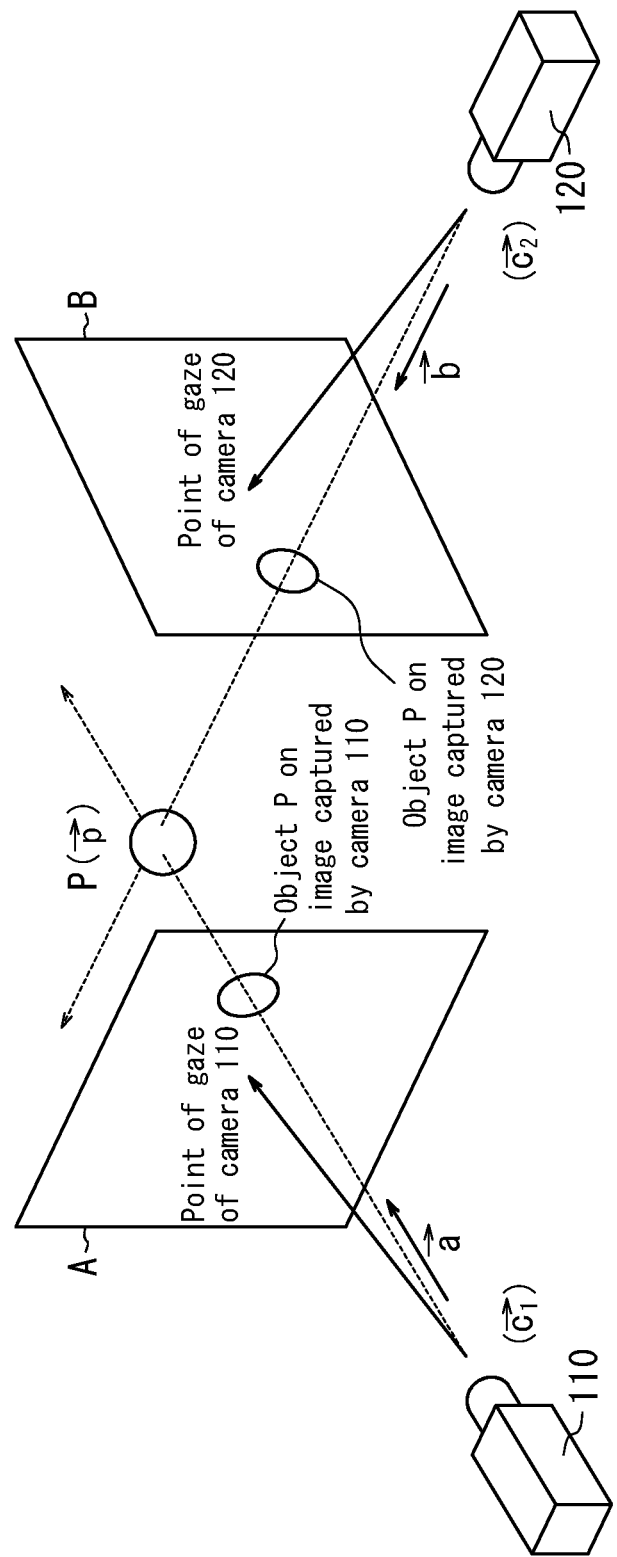
FIG. 2 is a schematic view illustrating a principle of position detection by a position detection system of FIG. 1.

FIG. 2 is a schematic view illustrating a principle of position detection by the position detection system 100 of FIG. 1. In the position detection system 100 according to the present embodiment, the first imaging apparatus 110 and the second imaging apparatus 120 each capture an image of an object P, whose position is to be detected. In the position detection system 100 according to the present embodiment, the information processing apparatus 130 calculates the position of the object P based on captured images acquired by the first imaging apparatus 110 and the second imaging apparatus 120. As illustrated in FIG. 2 as an example, the first imaging apparatus 110 and the second imaging apparatus 120 capture images of the object P from different directions. In the present embodiment, the object P is described as an infrared ray light emitting diode (LED) that emits a near-infrared ray of, for example, 700 to 1500 nm or so.

With reference to FIG. 1 again, the first imaging apparatus 110 includes a controller 111, a memory 112, a communication interface 113, and a first imaging unit 114. The first imaging apparatus 110 captures an image of the object P and transmits the captured image to the information processing apparatus 130.

The controller 111 is a processor that controls and manages the overall first imaging apparatus 110, including functional blocks included in the first imaging apparatus 110. The controller 111 is configured by a processor, such as a central processing unit (CPU), that executes a program prescribing control procedures. The program executed by the processor may be stored in, for example, the memory 112 or an external storage medium. The controller 111 may control imaging processing performed by the first imaging unit 114.

The memory 112 includes a variety of memory devices that may store a variety of information, such as data necessary for operation of the controller 111, depending on applications. The memory 112 also includes a device, such as a random access memory (RAM), that serves as a work memory. The memory 112 may store therein an image (hereinafter, may be called "first captured image") captured and acquired by the first imaging unit 114.

The communication interface 113 transmits and receives a variety of information to and from the information processing apparatus 130 via wired or wireless communications. Via the communication interface 113, the first imaging apparatus 110 may transmit the first captured image to the information processing apparatus 130.

The first imaging unit 114 captures an image of the object P. The first imaging unit 114 includes an imaging element (image sensor) that captures an image projected onto the element by converting light into an electric signal. In the present embodiment, the first imaging unit 114 is an infrared camera that detects an near-infrared ray emitted by the object P.

The second imaging apparatus 120 includes a controller 121, a memory 122, a communication interface 123, and a second imaging unit 124. Functions of the controller 121, the memory 122, the communication interface 123, and the second imaging unit 124 are respectively the same as those of the controller 111, the memory 112, the communication interface 113, and the first imaging unit 114 included in the first imaging apparatus 110, and a detailed description thereof is omitted herein. Herein, an image that is captured and acquired by the second imaging unit 124 may be hereafter called "second captured image."

The information processing apparatus 130 includes a controller 131, a memory 132, and a communication interface 133. The information processing apparatus 130 calculates the position of the object P based on captured images that are acquired by the first imaging apparatus 110 and the second imaging apparatus 120.

The controller 131 is a processor that controls and manages the overall information processing apparatus 130, including functional blocks included in the information processing apparatus 130. The controller 131 is configured by a processor, such as a CPU, that executes a program prescribing control procedures. The program executed by the processor may be stored in, for example, the memory 132 or an external storage medium. The controller 131 calculates the position of the object to be detected, based on the first captured image acquired by the first imaging apparatus 110 and the second captured image acquired by the second imaging apparatus 120. Calculation processing, performed by the controller 131, of calculating the position of the object to be detected is described below in detail.

The memory 132 includes a variety of memory devices that may store a variety of information, such as data necessary for operation of the controller 131, depending on applications. The memory 132 also includes a device, such as a RAM, that serves as a work memory. The memory 132 may store therein, for example, the first captured image and the second captured image that are respectively acquired from the first imaging apparatus 110 and the second imaging apparatus 120. The memory 132 may store therein, for example, a history of the calculated position of the object. The information processing apparatus 130 may calculate displacement (trajectory) of the object based on the history of the position of the object.

The communication interface 133 transmits and receives a variety of information to and from the first imaging apparatus 110 and the second imaging apparatus 120 via wired or wireless communications. Via the communication interface 133, the information processing apparatus 130 may receive the first captured image and the second captured image from the first imaging apparatus 110 and the second imaging apparatus 120, respectively.

Next, with reference to FIG. 2, a description is given of detail of the calculation processing, performed by the information processing apparatus 130, of calculating the position of the object to be detected.

In FIG. 2, an imaging range A of the first imaging apparatus 110 and an imaging range B of the second imaging apparatus 120 are illustrated virtually. That is to say, in FIG. 2, the imaging range A virtually illustrates the first captured image acquired by the first imaging apparatus 110, and the imaging range B virtually illustrates the second captured image acquired by the second imaging apparatus 120. The object P appears in a predetermined position on an image plane of each of the first captured image and the second captured image. In the first captured image and the second captured image, coordinates of the positions in which the object P appears are determined, with points of gaze of the first imaging unit 114 and the second imaging unit 124 being references.

In the present embodiment, a position vector of the first imaging apparatus 110 and a position vector of the second imaging apparatus 120 are denoted as a vector $c_1$ and a vector $c_2$, respectively. Furthermore, a direction vector directed from the first imaging apparatus 110 to the object P is denoted as a vector a, and a direction vector directed from the second imaging apparatus 120 to the object P is denoted as a vector b. The direction vector a is defined, for example, as the direction vector that is directed from the position of the imaging element included in the first imaging unit 114 toward the object P to be detected on the image plane of the first captured image. Similarly, the direction vector b is defined, for example, as the direction vector that is directed from the position of the imaging element included in the second imaging unit 124 toward the object P on the image plane of the second captured image. The direction vector a and the direction vector b may be calculated by the controller 131 of the information processing apparatus 130 based on the first captured image and the second captured image. The lengths of the direction vector a and the direction vector b in FIG. 2 are only illustrative. A position vector of the object P is denoted as a vector p.

The position vector p of the object P is represented by the following formula (1) using the position vector $c_1$ and the direction vector a. The controller 131 of the information processing apparatus 130 defines the position vector p as represented in the following formula (1).

$$\vec{p} = n\vec{a} + \vec{c_1} \qquad (1)$$

In the formula (1), n is a real number and is determined, for example, in accordance with a distance from a sensor position of the first imaging unit 114 to the object P to be detected. By calculating (determining) n, the position vector p is determined, and the position of the object P is determined.

Herein, a direction vector (herein, called vector d) directed from the second imaging apparatus 120 to the object P may be represented by the following formula (2) using the position vector $c_2$ of the second imaging apparatus 120. The controller 131 calculates the direction vector d.

$$\vec{d} = \vec{p} - \vec{c_2} = n\vec{a} + \vec{c_1} - \vec{c_2} \quad (2)$$

Since the direction vector d represented by the above formula (2) is defined as the direction vector directed from the second imaging apparatus 120 to the object P, the direction of the direction vector d is the same as the direction of the direction vector b. Accordingly, an angle formed between the direction vector d and the direction vector b is 0°, and the magnitude of a cross product between the direction vector d and the direction vector b is 0. This is represented by the following formula (3).

$$|\vec{d} \times \vec{b}| = |(n\vec{a} + \vec{c_1} - \vec{c_2}) \times \vec{b}| = 0 \quad (3)$$

By solving the formula (3) for n, the following formula (4) is derived.

$$n = \frac{|\vec{b} \times (\vec{c_1} - \vec{c_2})|}{|\vec{a} \times \vec{b}|} \quad (4)$$

By substituting the above formula (4) into the above formula (1), the position vector p is represented by the following formula (5).

$$\vec{p} = \frac{|\vec{b} \times (\vec{c_1} - \vec{c_2})|}{|\vec{a} \times \vec{b}|} \vec{a} + \vec{c_1} \quad (5)$$

In the above formula (5), the position vector $c_1$ and the position vector $c_2$ are determined by positions in which the first imaging apparatus 110 and the second imaging apparatus 120 are disposed. The direction vector a and the direction vector b may be calculated by the information processing apparatus 130 from the first captured image and the second captured image respectively acquired by the first imaging apparatus 110 and the second imaging apparatus 120. Accordingly, the information processing apparatus 130 may calculate the position vector p of the object P with use of the above formula (5). As represented by the formulae (3) through (5), the controller 131 calculates the position of the object P based on the direction vector d and the direction vector b. For example, the controller 131 may calculate the position of the object P based on the value of the cross product between the direction vector d and the direction vector b and with the assumption that the value of the cross product is 0. Thus, the position detection system 100 permits detection of the position of the object P.

In the position detection system 100 according to the present embodiment, the first imaging apparatus 110 and the second imaging apparatus 120 capture images of the object P from different directions. Accordingly, compared with a system, such as a stereo camera, that calculates a distance by taking advantage of parallax based on an image captured from a single direction with use of two cameras, the position detection system 100 according to the present embodiment improves precision in detection of the position.

The position detection system 100 may also identify, for each frame or for every predetermined count of frames captured by the first imaging apparatus 110 and the second imaging apparatus 120, the position of the object P.

Meanwhile, under certain situations, the position of the object P might not be identified temporarily with the aforementioned processing performed by the information processing apparatus 130. For instance, the object P might be hidden by an obstacle and, in this case, the object P fails to appear on an image captured by the first imaging apparatus 110 or the second imaging apparatus 120. Herein, the above state in which the object P fails to appear on a captured image is hereinafter called "mask state." In the mask state, the controller 131 cannot calculate the direction vector a or the direction vector b, and accordingly, cannot identify the position of the object P with the aforementioned formula (5).

For another instance, when the object P, whose position is to be detected by the position detection system 100, is provided in plurality, two or more objects P might be arranged in series with respect to a gaze direction of the first imaging apparatus 110 or the second imaging apparatus 120. In this case, the two or more objects P are overlapped on a captured image. Herein, the above state in which the two or more objects P are overlapped on a captured image is hereinafter called "cascade state." In the cascade state, the controller 131 might misconceive the positions of the two or more objects P when the state in which the two or more objects P are overlapped on the captured image is resolved. Thus, the controller 131 might determine the positions of the two or more objects P erroneously.

When the position of the object P is unidentifiable, the detection system 100 according to the present embodiment may determine whether the state in which the position of the object P is unidentifiable is caused by the mask state or by the cascade state. Now, a description is given of determination processing, performed by the position detection system 100, of determining whether the state in which the position of the object P is unidentifiable is caused by the mask state or by the cascade state. Herein, the mask state and the cascade state are hereinafter collectively called "lost state."

When the object(s) P is(are) in the mask state, the count of the object(s) P decreases in at least one of the first captured image and the second captured image. Assume, for example, that the position of a single object P is to be detected in the position detection system 100. In this case, when the object P is in the mask state, the count of the object P appearing on at least one of the first captured image and the second captured image is zero. Similarly, when two or more objects P are in the cascade state, the count of the objects P appearing on a captured image also decreases because the two or more objects P are overlapped on at least one of the first captured image and the second captured image. When, as described above, the count of the object(s) P decreases on at least one of the first captured image and the second captured image, the controller 131 of the information processing apparatus 130 determines that the object(s) P is(are) in the lost state.

When determining that the object(s) P is(are) in the lost state, the controller 131 determines whether the lost state is caused by the mask state or by the cascade state.

Now, firstly, processing performed by the controller 131 when the object P is in the mask state is described. Herein, a description is given of an example in which the object P fails to appear on the first captured image by the first imaging apparatus 110.

In the above description with respect to the calculation processing, performed by the controller 131, of calculating the position of the object P, the controller 131 is described to calculate the direction vector a and the direction vector b based on the first captured image and the second captured image. However, when the object P, which is in the mask state on the first captured image, does not appear on the first captured image, the controller 131 cannot calculate the direction vector a. In this case, the controller 131 determines the direction vector a based on a frame of the first captured image on which the object P has last appeared. That is to say, the controller 131 determines (presumes) the position on the frame in which the object P has last appeared as the position of the object P and defines the direction vector a based on this position of the object P.

In cases of the mask state, the controller 131 calculates the position vector p of the object P by the above formula (5) using the direction vector a defined as described above. The controller 131 continues to calculate the position vector p of the object P with use of the direction vector a defined as described above until the object P appears on the first captured image again. When the object P is out of the mask state, that is to say, when the object P appears on the first captured image, the controller 131 calculates the position of the object P by determining the direction vector a based on the first captured image again and by calculating the position vector p of the object P with use of the determined direction vector a.

Herein, when the object P is in the mask state, the controller 131 performs the calculation processing by presuming that the position on the frame in which the object P has last appeared is the position of the object P. However, the object P is actually moving, and the position of the object P might change. When the position of the object P that the controller 131 presumes differs from the actual position of the object P, the direction of the aforementioned direction vector d (refer to the above formula (2)), which is represented by using the position vector a, is not the same as the direction of the direction vector b, which is calculated based on the second captured image. This means that the magnitude of the cross product between the direction vector d and the direction vector b is not zero in this case. By taking advantage of the above, the controller 131 determines whether or not the object P is in the mask state based on whether or not the magnitude of the cross product between the direction vector d and the direction vector b is zero, that is to say, whether or not the above formula (3) holds. When the above formula (3) does not hold, the controller 131 determines that the object P is in the mask state. When the above formula (3) holds, the controller 131 determines that the object P is not in the mask state.

On the other hand, when two or more objects P are in the cascade state, the two or more objects P appear as a single object on a captured image. Herein, a description is given of an example in which the two or more objects P appear as a single object on the first captured image by the first imaging apparatus 110. In this case, a positional relation in the depth direction of the two or more objects P cannot be determined on the first captured image. However, since the two or more objects P appear on the first captured image, the controller 131 may determine the direction vector a based on the first captured image. Since the objects P are present on the direction vector a determined by the controller 131, the direction of the above direction vector d (refer to the above formula (2)), which is represented by using the position vector a, is the same as the direction of the direction vector b, which is calculated based on the second captured image. This means that the magnitude of the cross product between the direction vector d and the direction vector b is zero.

By taking advantage of the nature of the cross product between the direction vector d and the direction vector b in the mask state and in the cascade state, the controller 131 determines whether the lost state is caused by the mask state or by the cascade state. In detail, when the magnitude of the cross product between the direction vector d and the direction vector b is not zero, the controller 131 determines that the lost state is caused by the mask state. When the magnitude of the cross product between the direction vector d and the direction vector b is zero, the controller 131 determines that the lost state is caused by the cascade state.

The controller 131 may also set a predetermined threshold for the determination processing and determine whether the lost state is caused by the mask state or by the cascade state based on comparison between the threshold and the magnitude of the cross product. For example, when the magnitude of the cross product between the direction vector d and the direction vector b is greater than the threshold (e.g., 0.1), the controller 131 may determine that the lost state is caused by the mask state. When the magnitude of the cross product between the direction vector d and the direction vector b is less than or equal to the threshold, the controller 131 may determine that the lost state is caused by the cascade state. The determination by setting the threshold as above permits, even when certain tolerance occurs in the determination processing, determination taking the tolerance into account.

Figure 3:
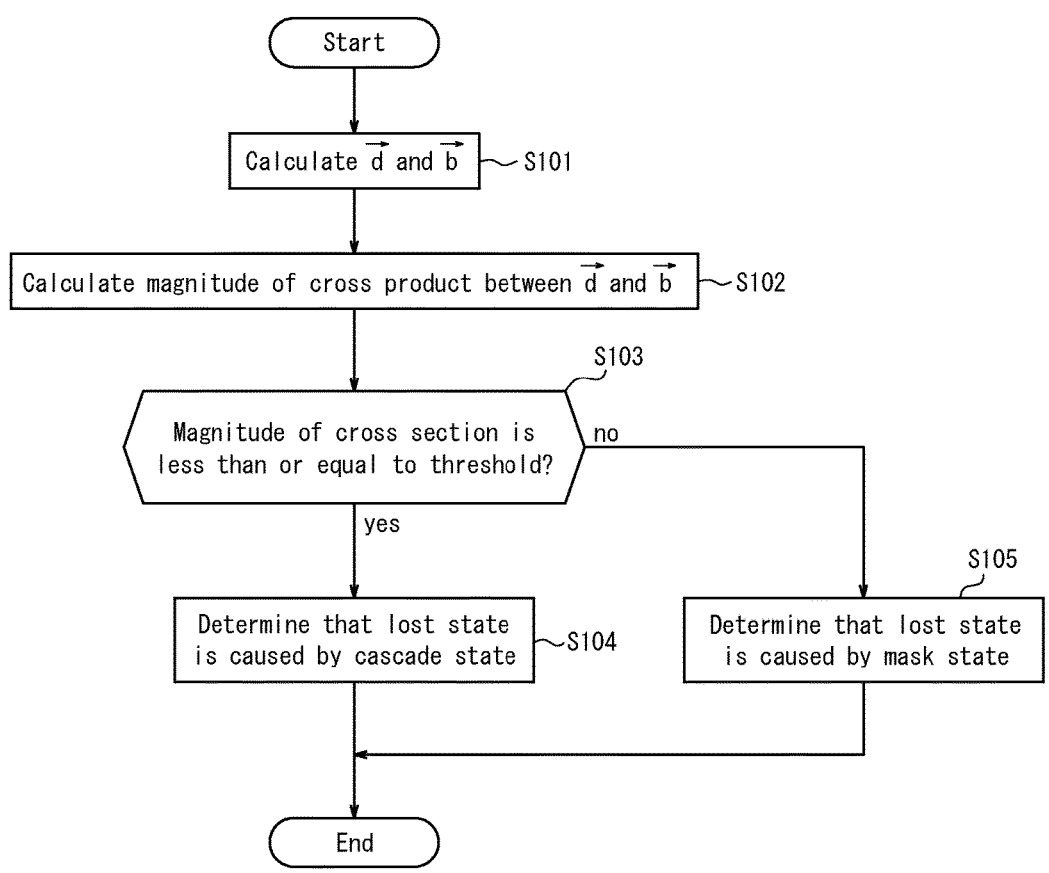
FIG. 3 is a flowchart illustrating an example of determination processing performed by an information processing apparatus to determine a cause of a lost state.

FIG. 3 is a flowchart illustrating an example of the determination processing performed by the information processing apparatus 130 to determine a cause of the lost state. The processing of FIG. 3 is performed when, for example, the controller 131 of the information processing apparatus 130 determines that the object P is in the lost state.

Firstly, the controller 131 calculates the direction vector d and the direction vector b based on the first captured image and the second captured image (Step S101).

The controller 131 calculates the magnitude of the cross product between the direction vector d and the direction vector b that are calculated in Step S101 (Step S102).

The controller 131 determines whether the magnitude of the cross product calculated in Step S102 is less than or equal to the predetermined threshold (Step S103).

When determining that the magnitude of the cross product is less than or equal to the predetermined threshold (Yes in Step S103), the controller 131 determines that the lost state is caused by the cascade state (Step S104). Then, the controller 131 ends the processing flow.

On the other hand, when determining that the magnitude of the cross product is greater than the predetermined threshold (No in Step S103), the controller 131 determines that the lost state is caused by the mask state (Step S105). Then, the controller 131 ends the processing flow.

The controller 131 may also detect the positions of the two or more objects P without misconception even when the two or more objects P fall into the cascade state by tracking, for each of the two or more objects P, a three-dimensional position. For example, to detect the positions of the objects P, the controller 131 calculates the positions of the two or more objects P when they are not in the lost state and, from a history of the calculated positions of the objects P, calculates displacement (trajectory) of the objects P. From the calculated displacement of the objects P, the controller 131 identifies a three-dimensional travelling direction of the objects P. Accordingly, even when the two or more objects P fall into the cascade state on a frame, the controller 131 predicts the positions of the two or more objects P on a subsequent frame based on the identified travelling direction. By bringing the predicted position of each object P into correspondence with the position of a different one of the objects P on the subsequent frame that is in close distance with the predicted position of the object P, the controller 131 detects the positions of the objects P. By thus tracking the positions of the objects P, the controller 131 predicts the positions of the objects P, and, based on the predicted positions, identifies the positions of the two or more objects P that are in the cascade state.

Since being capable of identifying the three-dimensional travelling direction of the objects P from the calculated displacement of the objects P, the controller 131 may also predict whether the two or more objects P are likely to fall into the cascade state. By predicting whether the two or more objects P are likely to fall into the cascade state, the controller 131 may also determine whether the lost state is caused by the mask state or by the cascade state. That is to say, when predicting that the two or more objects P are likely to fall into the cascade state, the controller 131 determines, in response to occurrence of the lost state, that the lost state is caused by the cascade state. When predicting that the two or more objects P are unlikely to fall into the cascade state, the controller 131 determines, in response to occurrence of the lost state, that the lost state is caused by the mask state.

Next, a description is given of an application example of the position detection system 100 described on the above. In the application example described herein, the position detection system 100 is applied to identify a position of a head mount display (HMD), which is a display apparatus mounted on a user's head. The HMD is an example of a detection target that is detectable by the position detection system 100. In an information display system in which the position detection system 100 is applied, the position of the HMD is identified by the aforementioned position detection system 100, and information in accordance with the identified position is displayed on a display included in the HMD.

Figure 4:
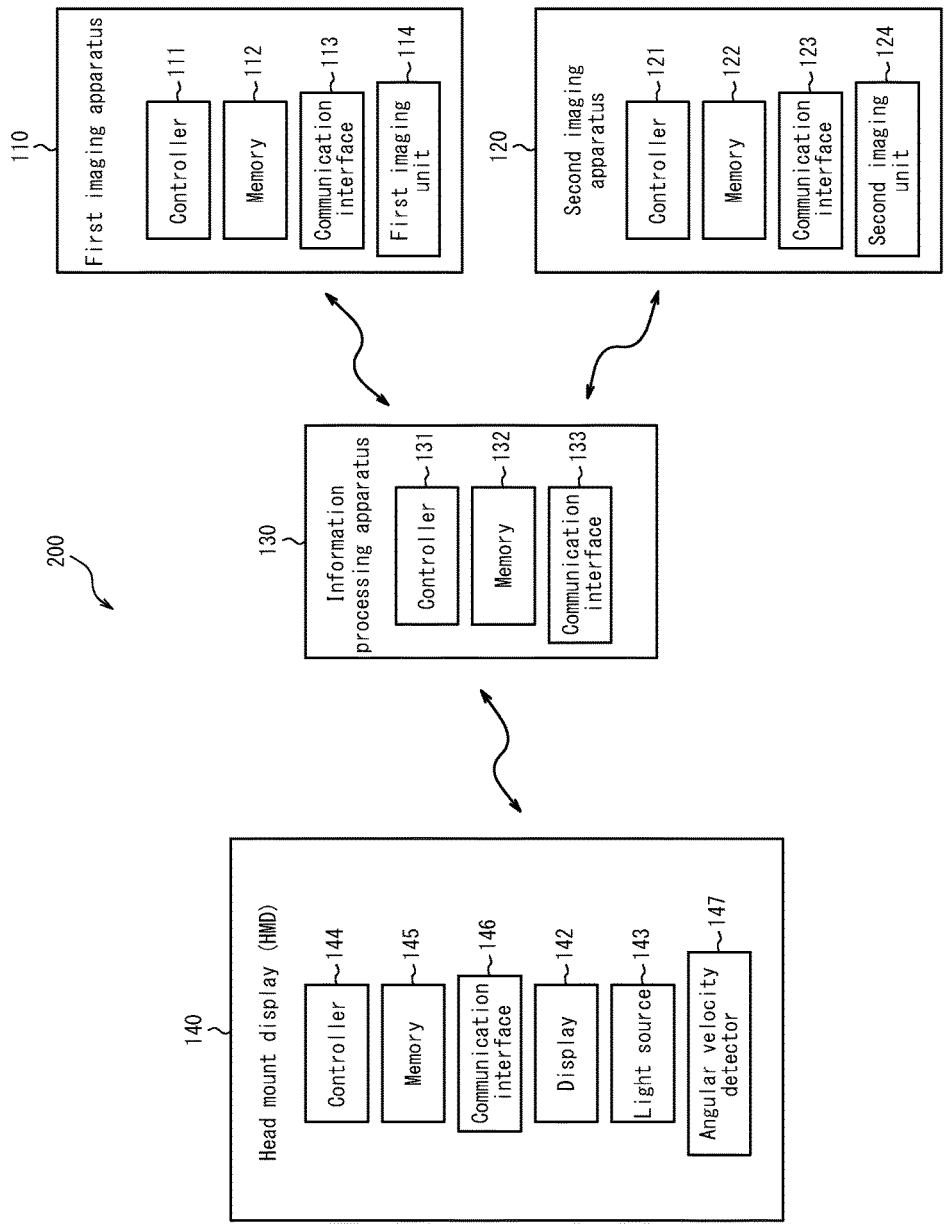
FIG. 4 is a function block diagram illustrating a schematic configuration of an information display system using a position detection system of FIG. 1.

FIG. 4 is a function block diagram illustrating a schematic configuration of an information display system in which the position detection system 100 is applied. As illustrated in FIG. 4, the information display system 200 includes a HMD 140, in addition to the first imaging apparatus 110, the second imaging apparatus 120, and the information processing apparatus 130, which are included in the position detection system 100. The information processing apparatus 130 is configured to communicate with the HMD 140 wiredly or wirelessly.

Figure 5:
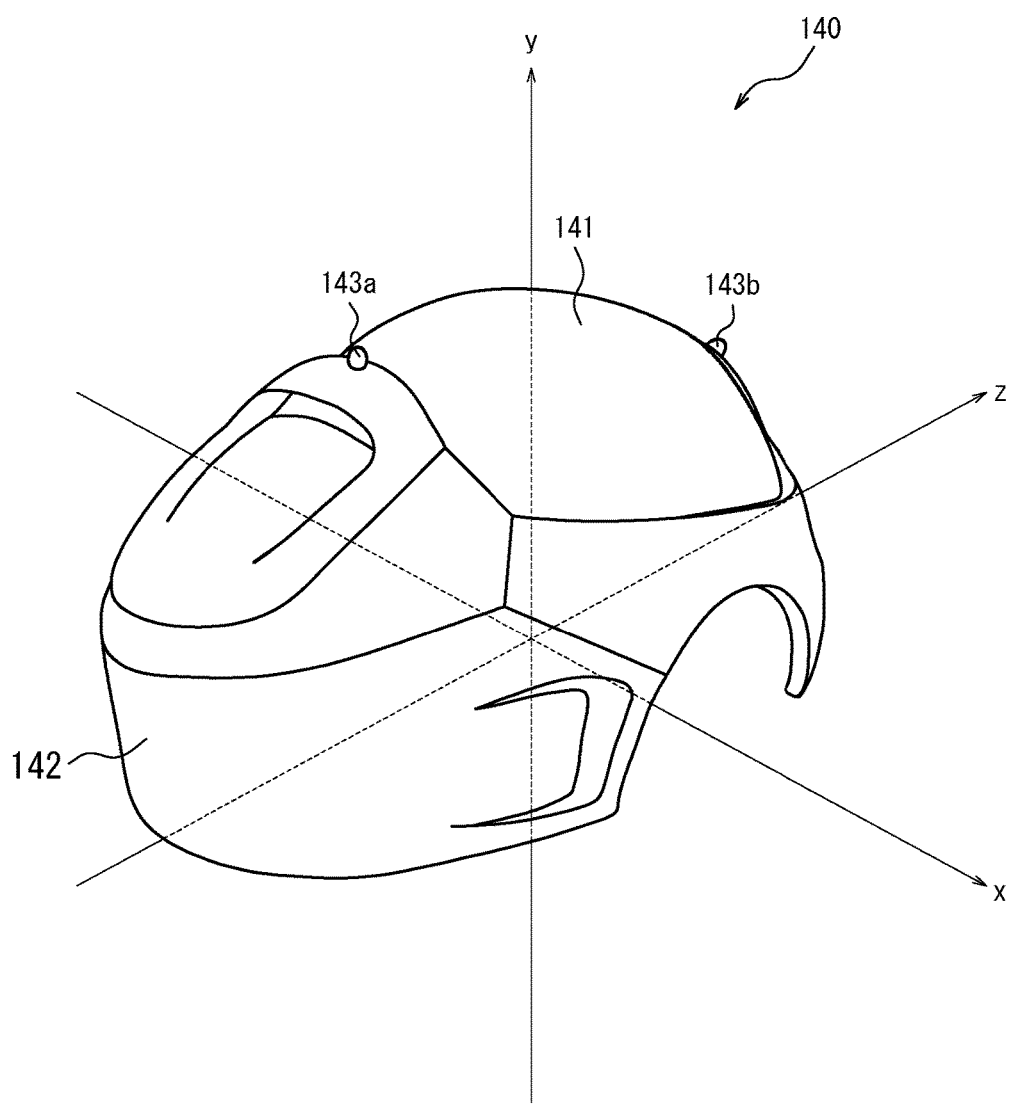
FIG. 5 is an external perspective view illustrating an example of a head mount display of FIG. 4.

FIG. 5 is an external perspective view illustrating an example of the HMD 140. The HMD 140 includes a substantially hemispherical mount portion 141, which may be mounted on a user's head, a display 142, which displays information to a user when the user wears the HMD 140, and a light source 143. In the present embodiment, as illustrated in FIG. 5, the HMD 140 is described to include two light sources, namely, a light source 143a (first marker) and a light source 143b (second marker). The two light sources 143a and 143b are collectively referred to as the light source 143 unless they are distinguished from each other.

With reference to FIG. 4 again, the HMD 140 includes the display 142, the light source 143, a controller 144, a memory 145, a communication interface 146, and an angular velocity detector 147.

The display 142 displays information to a user who wears the HMD 140. The display 142 may include a display, such as a liquid crystal display (LCD) or an organic electroluminescence display (OELD), that displays information. The display 142 may also include a housing that holds the display. Although in FIG. 5 illustrates the so-called immersive-type display 142, which has the housing that blocks a user's view of the ambient world, the display 142 is not limited to the immersive-type. The 142 may be, for example, a see-through-type that allows a user to visually perceive the ambient world via the display 142.

The light source 143 emits light that the first imaging apparatus 110 and the second imaging apparatus 120 detect. The object P described with respect to FIG. 2 may include the light source 143. Similarly to the object P described with respect to FIG. 2, the light source 143 is an infrared LED that emits a near-infrared ray. In the present embodiment, as illustrated in FIG. 5 as an example, the two light sources 143a and 143b are disposed on the mount portion 141 in a manner such that the two light sources 143a and 143b are arranged along the front-rear direction when a user wears the HMD 140.

The controller 144 is a processor that controls and manages the overall HMD 140, including functional blocks included in the HMD 140. The controller 144 is configured by a processor, such as a CPU, that executes a program prescribing control procedures. The program executed by the processor may be stored in, for example, the memory 145 or an external storage medium. The controller 144 controls the display 142 to display a variety of information in accordance with, for example, the position of a user, the direction of a user's head, or the like. For example, the controller 144 controls the display 142 to display virtual space in accordance with, for example, the position of a user and the direction of a user's head. The position of a user is determined by the position of the HMD 140, worn by the user, that is identified by the information processing apparatus 130. The direction of a user's head is determined by the direction of the HMD 140, which is worn on the user's head. The direction of a user's head may encompass a set of three axes directions of the head, changes thereof, or the like.

The memory 145 includes a variety of memory devices that may store a variety of information, such as data necessary for operation of the controller 144, depending on applications. The memory 145 also includes a device, such as a RAM, that serves as a work memory. The memory 145 stores therein a variety of data pertaining, for example, to virtual space displayed on the display 142.

The communication interface 146 includes a communication interface that transmits and receives a variety of information to and from the information processing apparatus 130 through wired or wireless communications. Via the communication interface 146, the HMD 140 may acquire information pertaining to the position of the HMD 140 that is identified by the information processing apparatus 130 based on the first captured image and the second captured image.

The angular velocity detector 147 may be a sensor that detects a change in angular velocity of the HMD 140. The angular velocity detector 147 may be configured by a gyro sensor. However, the angular velocity detector 147 is not limited to a gyro sensor. The angular velocity detector 147 only needs to detect a change in angle of the HMD 140. Accordingly, the angular velocity detector 147 may be configured by an acceleration sensor, an angular sensor, and other motion sensors, or a combination of these sensors. Information pertaining to a change in angular velocity that is detected by the angular velocity detector 147 is transmitted to the controller 144. Based on the information pertaining to a change in angular velocity that is acquired from the angular velocity detector 147, the controller 144 identifies the direction of a user's head. As illustrated in FIG. 5, for example, the angular velocity detector 147 detects a change in angular velocity around three axes, namely, a pitch axis (x-axis), a yaw axis (y-axis), and a roll axis (z-axis). Based on output from the angular velocity detector 147, the controller 144 identifies angles around the three axes of a user's head, that is to say, a pitch angle θ, a yaw angle Ψ, and a roll angle φ.

Figure 6:
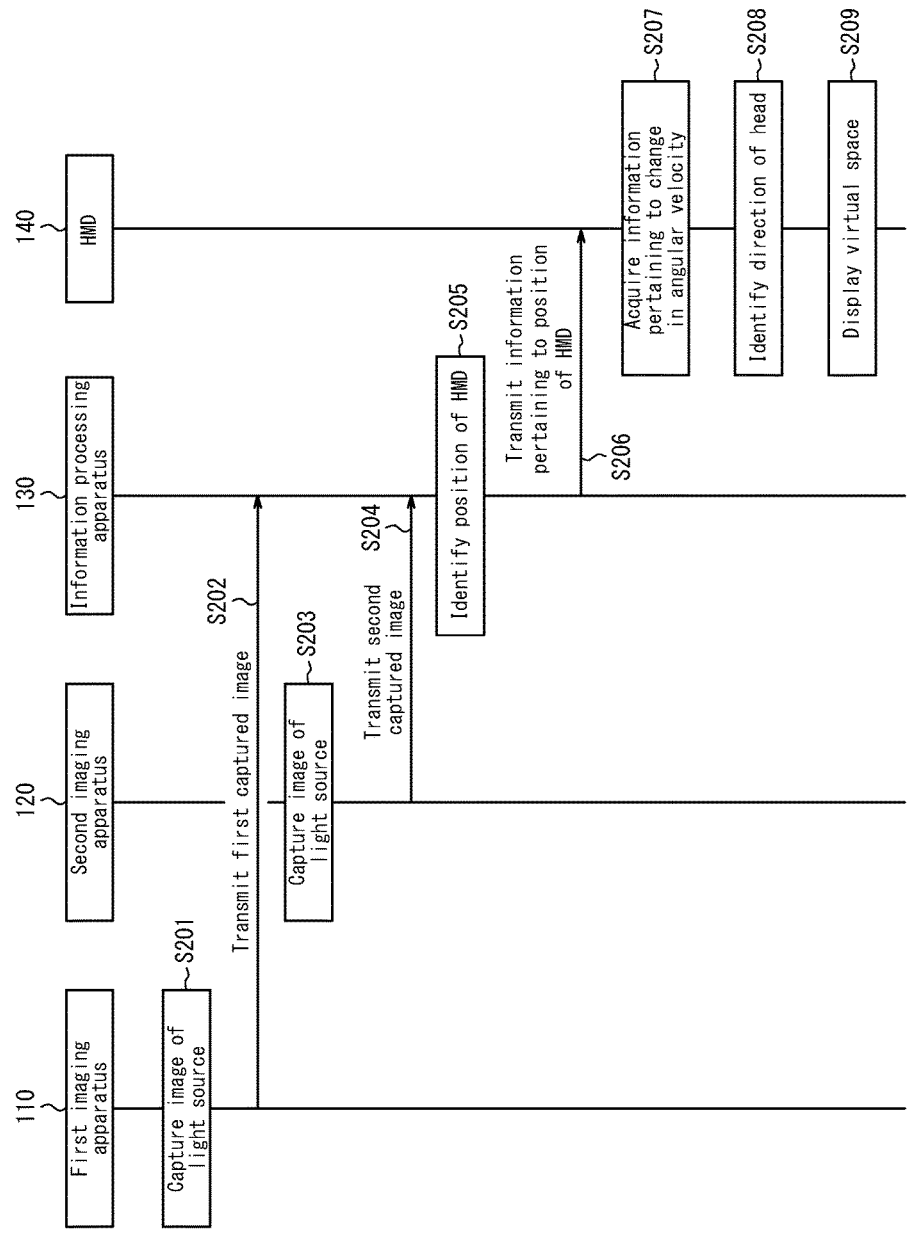
FIG. 6 is a sequence view illustrating an example of information display processing by an information display system of FIG. 4.

Next, with reference to FIG. 6, a description is given of virtual space display processing in the information display system 200.

Firstly, the first imaging apparatus 110 acquires the first captured image by capturing an image of the light source 143 (Step S201).

The first imaging apparatus 110 transmits the acquired first captured image to the information processing apparatus 130 (Step S202).

The second imaging apparatus 120 acquires the second captured image by capturing an image of the light source 143 (Step S203).

The second imaging apparatus 120 transmits the acquired second captured image to the information processing apparatus 130 (Step S204).

The processing in Steps S201 and S202 by the first imaging apparatus 110 and the processing in Steps S203 and S204 by the second imaging apparatus 120 may be performed simultaneously.

Upon acquiring the first captured image and the second captured image respectively from the first imaging apparatus 110 and the second imaging apparatus 120, the information processing apparatus 130 identifies the position of the HMD 140 based on the acquired captured images (Step S205). In detail, the information processing apparatus 130 identifies the position of the HMD 140 by calculating the position of the light source 143 by the formula (5) with use of, for example, the position of the first imaging apparatus 110 and the position of the second imaging apparatus 120, which are stored in the memory 132 in advance, and the acquired captured images.

The information processing apparatus 130 transmits, to the HMD 140, information pertaining to the identified position of the HMD 140 (Step S206).

With the angular velocity detector 147, the HMD 140 acquires information pertaining to a change in angular velocity of the HMD 140 (Step S207).

Then, based on the information pertaining to a change in angular velocity that is acquired by the angular velocity detector 147, the HMD 140 identifies the direction of a user's head (Step S208).

In accordance with the information pertaining to the position that is acquired from the information processing apparatus 130 in Step S206 and the direction of a user's head that is identified in Step S208, the HMD 140 displays virtual space on the display 142 (Step S209).

In this way, the information display system 200 displays virtual space on the display 142 in accordance with the position of the HMD 140 and the direction of a user's head. Since, in the information display system 200, the aforementioned position detection system 100 is applied to identify the position of the HMD 140, the position of the HMD 140 is identified with precision easily.

In the information display system 200, the HMD 140 identifies the direction of a user's head. Accordingly, compared with configurations in which, for example, the information processing apparatus 130 identifies the direction of a user's head based on the first captured image and the second captured image and notifies the HMD 140 of the identified direction of a user's head, the information display system 200 reduces delay in image with respect to a change in the direction of the user's head. This improves convenience of the information display system 200.

Embodiment 2

Embodiment 1 describes cases where the HMD 140 identifies the direction of a user's head. Embodiment 2 describes cases where the information processing apparatus 130 identifies the direction of a user's head. A description of parts of Embodiment 2 that are common to Embodiment 1 is omitted as needed. For example, in the present embodiment, the configurations of the first imaging apparatus 110, the second imaging apparatus 120, the information processing apparatus 130, and the HMD 140 are the same as those in Embodiment 1, and a detailed description of these configurations is omitted.

The HMD 140 may include the two light sources 143*a* and 143*b*. The information processing apparatus 130 acquires the first captured image and the second captured image respectively from the first imaging apparatus 110 and the second imaging apparatus 120. Based on the acquired first captured image and second captured image, the information processing apparatus 130 calculates the positions in three-dimensional space of the light sources 143*a* and 143*b*. Based on the positions of the light sources 143*a* and 143*b*, the information processing apparatus 130 identifies the position of the HMD 140.

Figure 7:
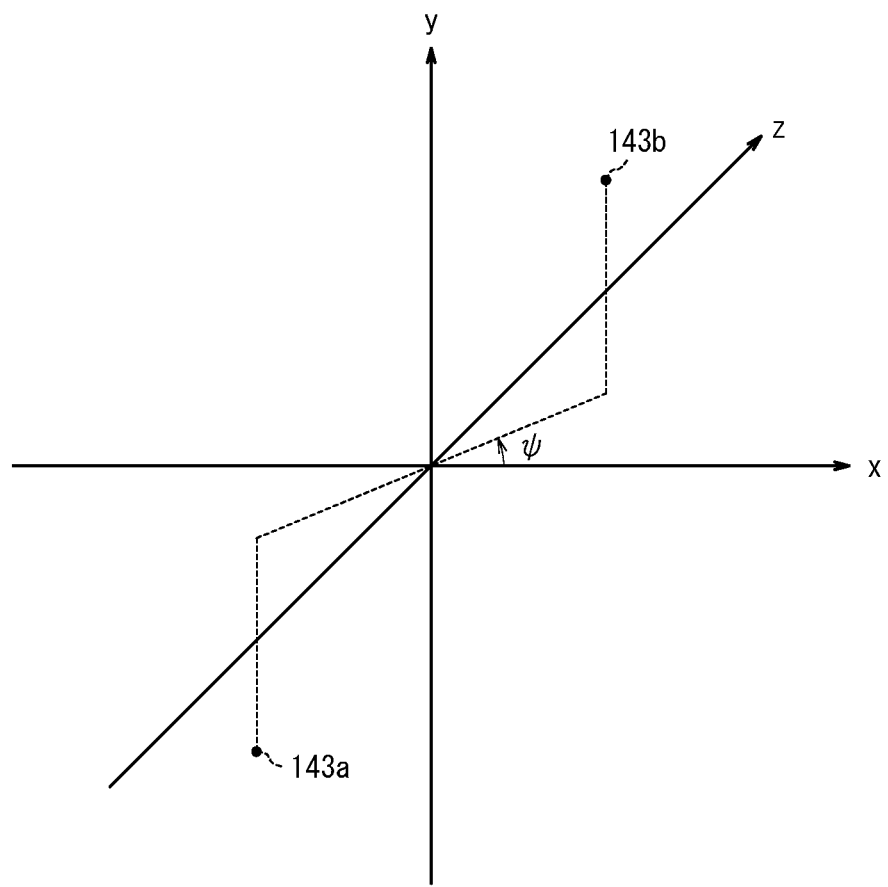
FIG. 7 illustrates positions in three-dimensional space of light sources included in a head mount display of FIG. 5.

The information processing apparatus 130 calculates the direction of a user's head, which encompasses the pitch angle θ, the yaw angle Ψ, and the roll angle φ herein, based on the positions of the light sources 143*a* and 143*b*. Now, with reference to FIG. 7, a description is given of a method of calculating the yaw angle Ψ, for example. The x-axis, y-axis, and z-axis in a left-handed coordinate system illustrated in FIG. 7 correspond to the pitch axis, the yaw axis, and the roll axis, respectively. Herein, position coordinates of the light source 143*a* are (x1, y1, z1), and position coordinates of the light source 143*b* are (x2, y2, z2). In this case, the angle (yaw angle Ψ) around the y-axis of the HMD 140 is represented by the following formula (6).

$$\Psi = \arctan\{(z2-z1)/(x2-x1)\} \quad (6)$$

Similarly, the angle (pitch angle θ) around the x-axis and the angle (roll angle φ) around the z-axis of the HMD 140 are represented by the following formulae (7) and (8).

$$\theta = \arctan\{(y2-y1)/(z2-z1)\} \quad (7)$$

$$\phi = \arctan\{(y2-y1)/(x2-x1)\} \quad (8)$$

In this way, the information processing apparatus 130 identifies the direction of a user's head based on the positions of the two light sources 143*a* and 143*b* included in the HMD 140. According to the information display system 200 herein, the positions of the light sources 143*a* and 143*b* are identified with high precision as described above. Accordingly, precision in the detected direction of a user's head is improved. The configuration in which the information processing apparatus 130 identifies the direction of a user's head omits the need for the angular velocity detector 147 in the HMD 140 and accordingly, allows a reduction in size and cost of the HMD 140.

Embodiment 3

Embodiment 2 describes cases where the information processing apparatus 130 identifies the direction of a user's head. Embodiment 3 describes cases where the HMD 140 and the information processing apparatus 130 each identify the direction of a user's head. In Embodiment 3, the information display system 200 may identify the direction of a user's head based on, for example, the direction (first identified value) identified by the HMD 140 and the direction (second identified value) identified by the information processing apparatus 130. A description of parts of Embodiment 3 that are common to Embodiment 1 is omitted as needed. For example, in the present embodiment, the configurations of the first imaging apparatus 110, the second imaging apparatus 120, the information processing apparatus 130, and the HMD 140 are the same as those in Embodiment 1, and a detailed description of these configurations is omitted.

In the present embodiment, the information processing apparatus 130 identifies the second identified value and transmits, to the HMD 140, information pertaining to the second identified value periodically. When not receiving the information pertaining to the second identified value from the information processing apparatus 130, the HMD 140 identifies the first identified value identified by the HMD 140 as the direction of a user's head. On the other hand, upon receiving he information pertaining to the second identified value from the information processing apparatus 130, the HMD 140 corrects the first identified valued identified by itself based on the second identified value identified by the information processing apparatus 130. For example, when the first identified value differs from the second identified value, the HMD 140 corrects the first identified value to be closer to the second identified value. The HMD 140 may correct the first identified value to match the second identified value. The HMD 140 identifies the corrected first identified value as the direction of a user's head.

The above configuration further improves precision in the identified direction of a user's head as described below. Generally, a gyro sensor detects angular accelerations generated when the gyro sensor itself is rotated. The detected angular accelerations are integrated over time domain, and thus, converted into relative angles (i.e., directions) from a reference direction. This means that errors in the detected angular accelerations are also integrated and accordingly, accumulated errors (drifting) might occur in the relative angles.

In the above regard, one existing way to reduce the accumulated errors generated in the pitch angle and the roll angle is to correct the pitch angle and the roll angle based on gravity components detected, for example, by an acceleration sensor. One existing way to reduce the accumulated errors generated in the yaw angle is to correct the yaw angle based on a geomagnetic component detected, for example, by a magnetometric sensor. Accordingly, to detect the direction of the object P with high precision with use of a gyro sensor, an acceleration sensor and a magnetometric sensor are generally required, and this may lead to an increase in size and cost of the apparatus. Since the correction of the yaw angle with use of a magnetometric sensor depends on precision in detection of the geomagnetic component, sufficient precision in correction is not always achieved.

On the other hand, in the information display system 200 with the above configuration, the first identified value pertaining to the direction of a user's head that is identified by the HMD 140 with use of the angular velocity detector 147 is corrected based on the second identified value pertaining to the direction of a user's head that is identified by the information processing apparatus 130 with use of the first captured image and the second captured image. Since the first identified value is corrected each time the information pertaining to the second identified value is transmitted from the information processing apparatus 130 to the HMD 140, precision in the identified direction of a user's head is improved. During an interval between each time the information pertaining to the second identified value is transmitted periodically, the first identified value is identified as the direction of a user's head. This permits the HMD 140 to display an image, with a reduced delay, that follows a change in the direction of a user's head in the interval shorter than a transmission cycle of the information pertaining to the second identified value, while improving precision in the identified direction of a user's head as described above.

Embodiments 2 and 3 describe the configuration in which the HMD 140 includes the two light sources 143a and 143b (the first marker and the second marker). However, even when the HMD 140 includes a single light source having a predetermined shape, the information processing apparatus 130 may identify the direction of a user's head. The predetermined shape refers to a shape that allows a plurality of feature points in the light source to be detected from a captured image. For example, when a light source having a polygonal shape is adopted, the information processing apparatus 130 detects, on a captured image, apexes or the contour of the polygon as the feature points. The information processing apparatus 130 utilizes the two feature points on a captured image, instead of two light sources 143a and 143b on a captured image, as the first marker and the second marker, to identify the direction of a user's head.

Embodiment 4

Figure 8:
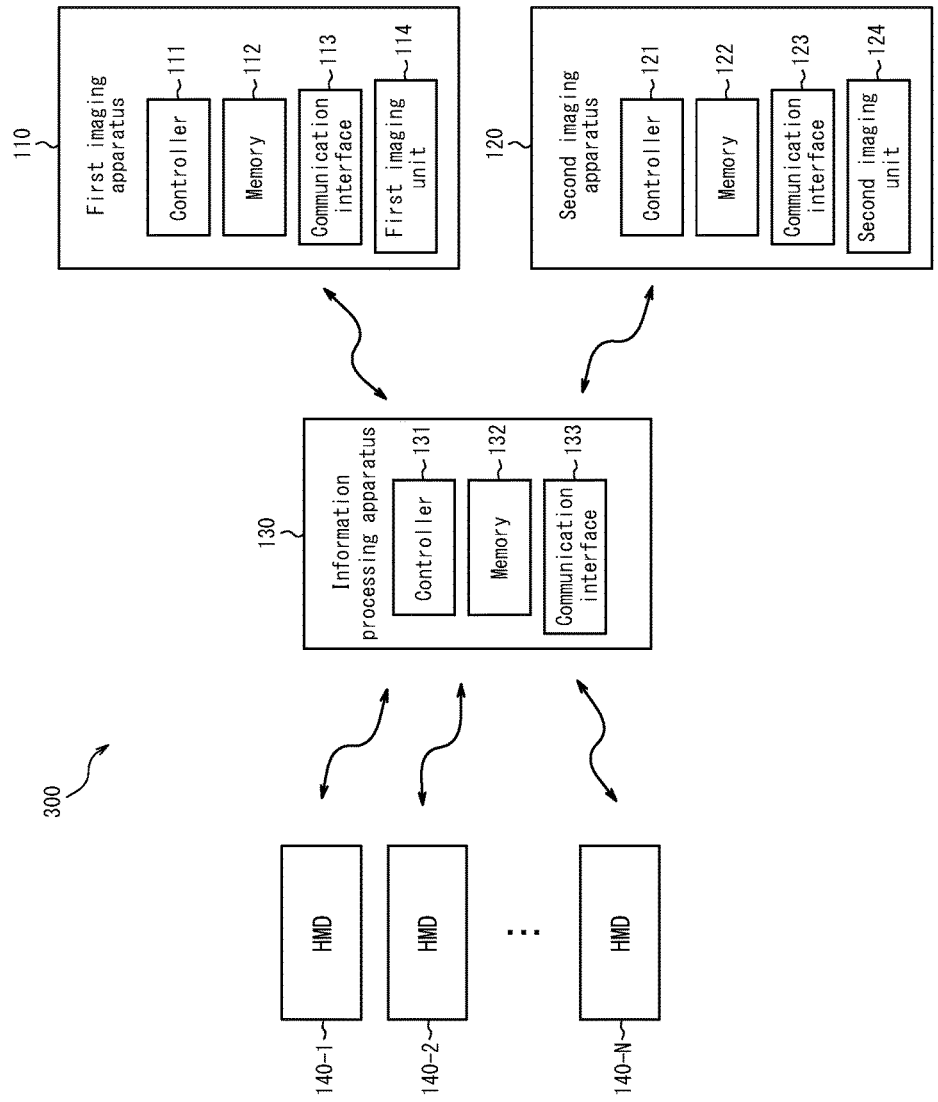
FIG. 8 is a function block diagram illustrating a schematic configuration of an information display system that includes a plurality of head mount displays and that uses a position detection system of FIG. 1.

In Embodiment 4, with reference to FIG. 8, a description is given of an example in which the position detection system 100, as described with respect to Embodiment 1, is applied to identify the position of the HMD 140, which is provided in plurality.

FIG. 8 is a function block diagram illustrating a schematic configuration of an information display system 300 in which the position detection system 100 is applied. As illustrated in FIG. 8, the information display system 300 includes the plurality of HMDs 140-1 to 140-N, in addition to the first imaging apparatus 110, the second imaging apparatus 120, and the information processing apparatus 130, which are included in the position detection system 100. The information processing apparatus 130 is configured to communicate with the HMDs 140-1 to 140-N wiredly or wirelessly. The internal configuration of the HMDs 140-1 to 140-N is the same as the internal configuration of the HMD 140 illustrated in FIG. 4, and a description thereof is omitted in FIG. 8. In the following description, the HMDs 140-1 to 140-N are simply referred to as the HMDs 140 unless they are distinguished from each other.

By the processing illustrated in Steps S201 through S205 in FIG. 6, the controller 131 may identify the positions of the HMD 140. When identifying the positions of the plurality of HMDs 140-1 to 140-N as illustrated in FIG. 8, the controller 131 identifies correspondence between the positions of the light sources 143 and the positions of the N HMDs 140. Hereinafter, the identification, performed by the controller 131 for the plurality of light sources 143, of correspondence between the light sources 143 and the HMDs 140 may also be called "distinguishment" of the plurality of light sources 143 by the controller 131.

The controller 131 performs the distinguishment processing for the light sources 143 at, for example, opening time of a facility in which the HMDs 140 are used. The controller 131 may turn on the light sources 143 of the HMDs 140-1 to 140-N sequentially. The controller 131 brings the position of one of the light sources 143, which is newly detected when the light source 143 of the HMD 140-1 is turned on, into correspondence with the position of the HMD 140-1. Similarly, the controller 131 establishes, for the HMD 140-2 to HMD 140-N, correspondence between the remaining light sources 143 and the positions of the HMD 140-2 to HMD 140-N.

Once the controller 131 performs the distinguishment processing, the controller 131 may continue to track the correspondence between the light sources 143 and the HMDs 140 by storing, in the memory 132, a history of the subsequent positions of the HMDs 140 (positions of the light sources 143).

Meanwhile, in the information display system 300, which includes the plurality of HMDs 140 as in the present embodiment, for instance, any of the light sources 143 might be hidden by an obstacle, and this may cause the mask state. For another instance, the light sources 143 of two or more of the HMDs 140 might be arranged in series with respect to the gaze direction of the first imaging apparatus 110 or the second imaging apparatus 120. In this case, the two or more light sources 143 are overlapped on a captured image, and this may cause the cascade state.

When any of the light sources 143 is in the mask state, the count of the light sources 143 is reduced in at least one of the first captured image and the second captured image. Similarly, when any two or more light sources 143 are in the cascade state, the count of the light sources 143 appearing on a captured image is reduced because the two or more light sources 143 are overlapped on at least one of the first captured image and the second captured image. When, as described above, the count of the light sources 143 decreases on at least one of the first captured image and the second captured image, the controller 131 of the information processing apparatus 130 determines that the light source(s) 143 is(are) in the lost state.

When the light sources 143 of some of the HMDs 140-1 to 140-N are maintained in the lost state continuously, the controller sometimes fails to establish, for the some of the light sources 143, correspondence between the light sources 143 and the HMDs 140 even after the light sources 143 are recovered from the lost state. That is to say, the lost state might result in failure of the controller 131 to distinguish the light sources 143. Assume, for example, that two light sources 143 fall into the lost state and then are recovered from the lost state after sufficiently long time. In this case, even when a history of the positions of the two light sources 143, which fall into the lost state, is tracked immediately before the two light sources 143 fall into the lost state, the controller 131 cannot determine which HMDs 140 correspond to the recovered light sources 143.

When the lost state results in failure of the controller 131 to distinguish at least one of the light sources 143 as described above, the controller 131 cannot display appropriate information on the displays 142 of the HMDs 140. In this situation, the controller 131 therefore turns off all the light sources 143 temporarily and then, performs the distinguishment processing again. Hereinafter, performing the distinguishment processing again may also be referred to as performing "redistinguishment processing."

When the lost state results in failure to distinguish the light sources 143, the controller 131 may perform the redistinguishment processing at various timings.

For example, the controller 131 may perform the redistinguishment processing at a stage when the positions of all the light sources 143 become calculatable. By doing so, the controller 131 establishes, for all the HMDs 140-1 to 140-N, correspondence with the light sources 143.

The controller 131 may also perform the redistinguishment processing at a stage when the positions of a predetermined percentage of the total number of light sources 143 (e.g., 95% of the light sources 143) become calculatable. By doing so, even when some of the light sources 143 remain in the lost state and are not recovered for long time, the controller 131 establish, for the remaining light sources 143 whose positions are calculatable at that point, correspondence with the corresponding ones of the HMDs 140-1 to 140-N.

The controller 131 may also perform the redistinguishment processing at a stage when at least one of the light sources 143 is recovered from the lost state and the position of the recovered light source 143 becomes calculatable. The controller 131 may also perform the redistinguishment processing upon a lapse of predetermined time after at least one of the light sources 143 falls into the lost state.

Thus, the position detection system 300 performs the redistinguishment processing when the lost state results in failure to distinguish at least one of the light sources 143. Accordingly, the plurality of light sources 143 are brought into correspondence with the HMDs 140 again, and convenience of the position detection system 300 is improved.

Note that the present disclosure is not limited to the embodiments set forth above and may be modified or varied in a multiple ways. For example, functions and the like included in various component parts and the like may be rearranged as long as the functions and the like are logically consistent. A plurality of component parts and the like may also be integrated or separated.

For example, although in the above embodiments the position detection system 100 is described to include the two imaging apparatuses 110 and 120, the position detection system 100 may include three or more imaging apparatuses. When the position detection system 100 includes three or more imaging apparatuses, the information processing apparatus 130 identifies the position of the object P based on captured images acquired by any two of the imaging apparatuses. In this case, even when the object P does not appear in a captured image acquired by any of the imaging apparatuses due to, for example, an obstacle blocking the object P, the information processing apparatus 130 may identify the position of the object P with use of another captured image in which the object P appears.

In the above application example, the HMD 140 is described to include the two light sources 143a and 143b. However, the count of light sources included in the HMD 140 is not limited to two. The HMD 140 may include a single, or, three or more light sources.

In the above application example, the HMD 140 is described to include the light source 143. However, the application example is not limited to this example. The light source 143 may be included in any apparatus other than the HMD 140, and in this case, the information processing apparatus 130 may identify the position of the apparatus that includes the light source 143.

The HMD 140 may transmit the information pertaining to the direction of a user's head to an external apparatus, such as the information processing apparatus 130. The above configuration further improves convenience of the information display system 200 as described below.

For example, after receiving the information pertaining to the direction of a user's head, the information processing apparatus 130 may display, on an external display apparatus or the like, a predetermined image in accordance with the position of the HMD 140 and the direction of the user's head. Examples of the predetermined image may include a variety of images, such as an image that is substantially the same as an image displayed on the HMD 140 and a map image that indicates the position and the direction of the user in virtual space. Herein, when the information display system 200 includes a plurality of HMDs 140, the information processing apparatus 130 may, for example, display, on the second HMD 140, an image that is displayed on the first HMD 140 or display, on the plurality of HMDs 140, a map image that indicates the positions and the directions of a plurality of users.

After receiving the information pertaining to the direction of a user's head, the information processing apparatus 130 may also predict the direction in which the position of the user is displaced based on the received information pertaining to the direction.

All the processing that the information processing apparatus 130 performs in the above application example may be performed by the HMD 140. In this case, the information display system 200 may be configured by the first imaging apparatus 110, the second imaging apparatus 120, and the HMD 140. Furthermore, in this case, the HMD 140 is configured to communicate with the first imaging apparatus 110 and the second imaging apparatus 120 wiredly or wirelessly.

Information processing apparatuses, such as computers or mobile phones, may be used to serve as the imaging apparatuses 110 and 120, the information processing apparatus 130, and the HMD(s) 140 according to the above embodiments. Such an information processing apparatus may be achieved by storing, in a memory of the information processing apparatus, a program describing contents of processing required for functions of the imaging apparatuses 110 and 120, the information processing apparatus 130, and the HMD(s) 140 according to the above embodiments and by causing a processor of the information processing apparatus to retrieve and execute the program.

The invention claimed is:

1. A detection method performed by a system comprising a first imaging unit and a second imaging unit that each capture an image of an object, the detection method comprising:
   acquiring a first captured image with use of the first imaging unit;
   acquiring a second captured image with use of the second imaging unit;
   defining a position vector of the object based on the first captured image;
   calculating a first direction vector directed from the second imaging unit to the object with use of the defined position vector;
   calculating a second direction vector directed from the second imaging unit to the object based on the second captured image; and
   calculating a position of the object based on the first direction vector and the second direction vector.

2. The detection method according to claim 1, wherein the position of the object is calculated based on a value of a cross product between the first direction vector and the second direction vector.

3. The detection method according to claim 1, wherein the position of the object is calculated based on the position vector of the object that is calculated based on the first direction vector and the second direction vector and that is represented by the following formula (1):

$$\vec{p} = \frac{|\vec{b} \times (\vec{c_1} - \vec{c_2})|}{|\vec{a} \times \vec{b}|} \vec{a} + \vec{c_1}, \quad (1)$$

wherein vector p represents the position vector of the object, vector a represents a direction vector directed from the first imaging unit to the object, vector b represents the direction vector directed from the second imaging unit to the object, vector $c_1$ represents a position vector of the first imaging unit, and vector $c_2$ represents a position vector of the second imaging unit.

4. The detection method according to claim 1, wherein the first imaging unit and the second imaging unit capture the images of the object from different directions.

5. The detection method according to claim 1, further comprising:
   identifying positions of a first marker and a second marker, which serve as the object, based on the first captured image and the second captured image; and
   identifying a direction of a detection target, which includes the first marker and the second marker, based on the positions of the first marker and the second marker.

6. The detection method according to claim 5, wherein the direction of the detection target encompasses a yaw angle of the detection target.

7. The detection method according to claim 5, further comprising:
   identifying the direction of the detection target with use of a sensor disposed on the detection target; and
   correcting the direction of the detection target identified with use of the sensor based on the direction of the detection target identified based on the positions of the first marker and the second marker.

8. The detection method according to claim 1, further comprising:
   determining, in a lost state in which the position of the object is unidentifiable, whether the lost state is caused by a mask state in which the object fails to appear on at least one of the first captured image and the second image or by a cascade state in which the object is provided in plurality and in which two or more of the plurality of objects are overlapped in a gaze direction of at least one of the first imaging unit and the second imaging unit, based on the first direction vector and the second direction vector.

9. The detection method according to claim 8, wherein the determination of whether or not the lost state is caused by the mask state is made based on a cross product between the first direction vector and the second direction vector.

10. The detection method according to claim 9, wherein the determination of whether or not the lost state is caused by the mask state is made by calculating n represented by the following formula (2) based on the first captured image and the second captured image and determining whether or not the following formula (3) is satisfied:

$$n = \frac{|\vec{b} \times (\vec{c_1} - \vec{c_2})|}{|\vec{a} \times \vec{b}|}; \text{ and} \quad (2)$$

$$|(n\vec{a} + \vec{c_1} - \vec{c_2}) \times \vec{b}| = 0, \quad (3)$$

wherein vector a represents a direction vector directed from the first imaging unit to the object, vector b represents the direction vector directed from the second imaging unit to the object, vector $c_1$ represents a position vector of the first imaging unit, and vector $c_2$ represents a position vector of the second imaging unit.

11. The detection method according to claim 1, further comprising:
calculating, for the object provided in plurality, the position of each of the plurality of objects based on the first captured image and the second captured image to distinguish the plurality of objects; and
performing redistinguishment processing for the plurality of objects when at least one of the plurality of objects falls into a lost state and becomes unidentifiable.

12. A detection system, comprising:
a first imaging unit that acquires a first captured image pertaining to an object;
a second imaging unit that acquires a second captured image pertaining to the object; and
a controller that calculates a position of the object based on the first captured image and the second captured image, wherein
the controller defines a position vector of the object based on the first captured image, calculates a first direction vector directed from the second captured image to the object with use of the defined position vector, calculates a second direction vector directed from the second imaging unit to the object based on the second captured image, and calculates the position of the object based on the first direction vector and the second direction vector.

13. The detection system according to claim 12, wherein the controller
calculates, for the object provided in plurality, the position of each of the plurality of objects based on the first captured image and the second captured image to distinguish the plurality of objects, and
performs redistinguishment processing for the plurality of objects when at least one of the plurality of objects falls into a lost state and becomes unidentifiable.

14. The detection system according to claim 13, wherein the controller performs the redistinguishment processing once a count of objects whose positions are calculatable satisfies a predetermined condition when the at least one of the plurality of objects becomes unidentifiable.

15. The detection system according to claim 14, wherein the controller performs the redistinguishment processing once the positions of all the plurality of objects become calculatable.

16. The detection system according to claim 14, wherein the controller performs the redistinguishment processing once a percentage of the count of objects whose positions are calculatable with respect to a total count of the plurality of objects reaches a predetermined percentage or more.

17. The detection system according to claim 14, wherein the controller performs the redistinguishment processing once the position of the at least one of the plurality of objects in the lost state becomes calculatable.

18. The detection system according to claim 13, wherein the controller performs the redistinguishment processing upon a lapse of predetermined time after the at least one of the plurality of objects falls into the lost state.

* * * * *